United States Patent [19]

Cooper

[11] Patent Number: 5,056,864
[45] Date of Patent: * Oct. 15, 1991

[54] WORK STATION SYSTEM

[75] Inventor: Lloyd G. B. Cooper, Birmingham, Ala.

[73] Assignee: Workstation Environments, Birmingham, Ala.

[*] Notice: The portion of the term of this patent subsequent to Apr. 10, 2007 has been disclaimed.

[21] Appl. No.: 505,484

[22] Filed: Apr. 6, 1990

Related U.S. Application Data

[63] Continuation of Ser. No. 367,469, Jun. 19, 1989, Pat. No. 4,915,450, which is a continuation-in-part of Ser. No. 261,525, Oct. 24, 1988, Pat. No. 4,880,270, which is a continuation-in-part of Ser. No. 934,970, Nov. 25, 1986, Pat. No. 4,779,922.

[51] Int. Cl.⁵ ............................................. A47C 7/62
[52] U.S. Cl. .................................... 297/188; 297/170; 297/217; 297/346; 297/423
[58] Field of Search ............... 297/423, 429, 463, 217, 297/188, 135, 170, 171, 174, 313, 325, 311, 330, 345, 346, 433, 436, 326, 327; 248/919

[56] References Cited

U.S. PATENT DOCUMENTS 490,516  1/1893  Starr ................................ 297/429 X
1,469,928 10/1923 Lazar .............................. 297/217 X
4,560,200 12/1985 Gianelli .............................. 297/346

OTHER PUBLICATIONS

Luigi Colani; Designing Tomorrow-Car Styling No. 23-Imported from Japan by Kaneko Enterprises, Inc., 15641 Product Lane, A-10 Huntington, CA 92649.

Primary Examiner—Peter R. Brown
Attorney, Agent, or Firm—Griffin Branigan & Butler

[57] ABSTRACT

A work station system (20) comprises a frame substructure (24) for holding aloft a horizontal axial shaft (74). A chair (22) is coupled to the shaft (74) by chair coupling member (90); a device carriage (27) is coupled to the shaft (74) by a carriage coupling member (92); and a footrest assembly (28) is coupled to the shaft (74) by a footrest coupling member (94). The chair (22), device carriage (27), and footrest assembly (28) are coupled to the shaft (74) to selectively pivot together about the shaft (74), and in such a manner that a constant spatial relationship is maintained between the chair (22) and the device carriage (27). The chair (22) is swively connected to the chair coupling member (90). The frame substructure (24) is situated substantially entirely on one side of a perpendicular bisector (78) dropped from the shaft (74) to a base (50). The frame substructure (24) includes axis elevating means (34) for elevating the shaft (74). The axis elevating means (34) carries a support surface (248) which is accessible by a human operator.

23 Claims, 5 Drawing Sheets

WORK STATION SYSTEM

This is a continuation of U.S. patent application Ser. No. 367,469 filed June 19, 1989, now U.S. Pat. No. 4,915,450, which is a continuation-in-part application of U.S. patent application Ser. No. 07/261,525, filed Oct. 24, 1988, now U.S. Pat. No. 4,880,270, which in turn is a continuation-in-part of U.S. Pat. application Ser. No. 06/934,970, filed Nov. 25, 1986, now U.S. Pat. No. 4,779,922.

BACKGROUND

1. Field of the Invention

This invention relates to furniture such as office furniture, and in particular relates to ergonometric work stations.

2. Prior Art and Other Considerations

Machine operators such as typists and video display terminal operators frequently complain that the nature and positioning of the work surface upon which their equipment is placed causes fatigue. In particular, at a conventional desk an operator must sit, perhaps for hours, with the operator's back being essentially vertical in relation to the floor. Sitting erect subjects an individual's back to an increased bending moment which is substantially larger than the bending moment which is placed on an individual's spine when the individual is standing erect. This increased spinal loading for extended periods of time leads to back injury. Also, it is not uncommon for a conventional desk to be either too high or too low for a particular operator. Such aggravations reduce the productivity of the employee.

Consequently, effort has been directed towards developing improved work stations. More recently the ergonometric relationships between the user and a computer or video display terminal have been brought into consideration, primarily because of the unique problems facing this type of system usage.

Various prior art devices provide a work surface which is ultimately connected to a seat. for many of these devices it is not possible to adjust the positioning of the work surface, such as the angle of inclination of the work surface. For other devices it is not possible to selectively adjust the extent to which the seat reclines, much less to make such a seat adjustment while maintaining a constant spatial relationship between the work surface and the seated operator.

In view of the above, it is an object of the present invention to provide a work station wherein the spatial distance between a work surface and a seated operator remains essentially constant as a seat is selectively adjustable about a horizontal axis.

An advantage of the invention is the provision of a work station for which an operator can selectively adjust the height and angle of inclination of a plurality of support surfaces.

Another advantage of the invention is the provision of an adjustable arm support which permits an operator to rest his arms in a range of comfortable positions.

Another advantage of the present invention is the provision of a work station for which the positioning of a work surface relative to a chair can be adjusted to take into consideration the physical characteristics and preferences of an operator.

SUMMARY

A work station system comprises a frame substructure for holding aloft a horizontal axial shaft. A chair is coupled to the shaft by a chair coupling member; a device carriage is coupled to the shaft by a carriage coupling member; and a footrest assembly is coupled to the shaft by a footrest coupling member.

The chair, device carriage, and footrest assembly are coupled to the horizontal axial shaft to selectively pivot together about a horizontal axis, and in such a manner that a constant spatial relationship is maintained between the chair and the device carriage.

The chair is swivelly connected to the chair coupling member to facilitate ingress and egress from the work station system. The chair coupling member also has one end of a pivoting drive means connected thereto.

The frame substructure is situated substantially entirely on one side of a perpendicular bisector dropped from the horizontal axial shaft to a base or floor. The frame substructure has a front wall which is angularly inclined with respect to the horizontal and which extends toward the horizontal axial shaft.

The frame substructure includes axis elevating means for elevating the horizontal axial shaft. The axis elevating means includes a frame carriage which travels along an inclined, linear path. The frame carriage carries a support surface which is accessible by a human operator. In this regard, an extension provided on the frame carriage extends through a slot provided in a frame housing and has the support surface mounted thereon. Thus, when the horizontal axis of the system is elevated, the support surface is elevated and remains accessible to the operator.

The frame carriage also carries one end of a pivoting drive means. The pivoting drive means is employed for selectively pivoting in unison the chair, the device carriage, and the footrest. The other end of the pivoting drive means is connected to the seat coupling member.

The footrest assembly and the device carriage are extendable in directions away from the horizontal axial shaft. Moreover, the angular position of the footrest assembly relative to the device carriage is adjustable.

DETAILED DESCRIPTION OF THE DRAWINGS

An ergomometric work station 20 comprises a chair 22 for supporting a human operator in a seated position;

a frame substructure 24 for holding aloft a horizontal axis 26; device carriage 27; footrest assembly 28; coupling means 30 for coupling the chair 22, device carriage 27, and the footrest 28 proximate the horizontal axis 26; pivoting drive means 32; and, axis elevating means 34.

Figure 1:
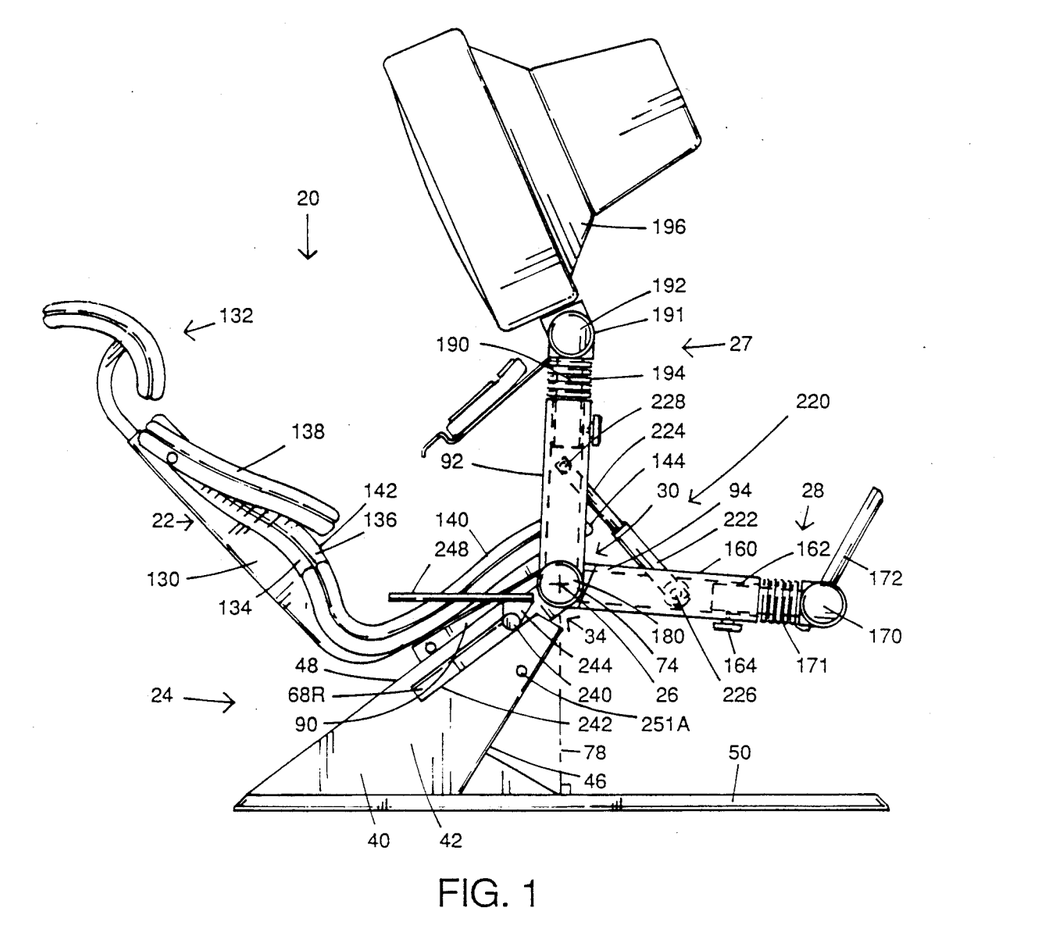
FIG. 1 is a side view of a work station system according to an embodiment of the invention and showing a seat in a reclined position.
Figure 2:
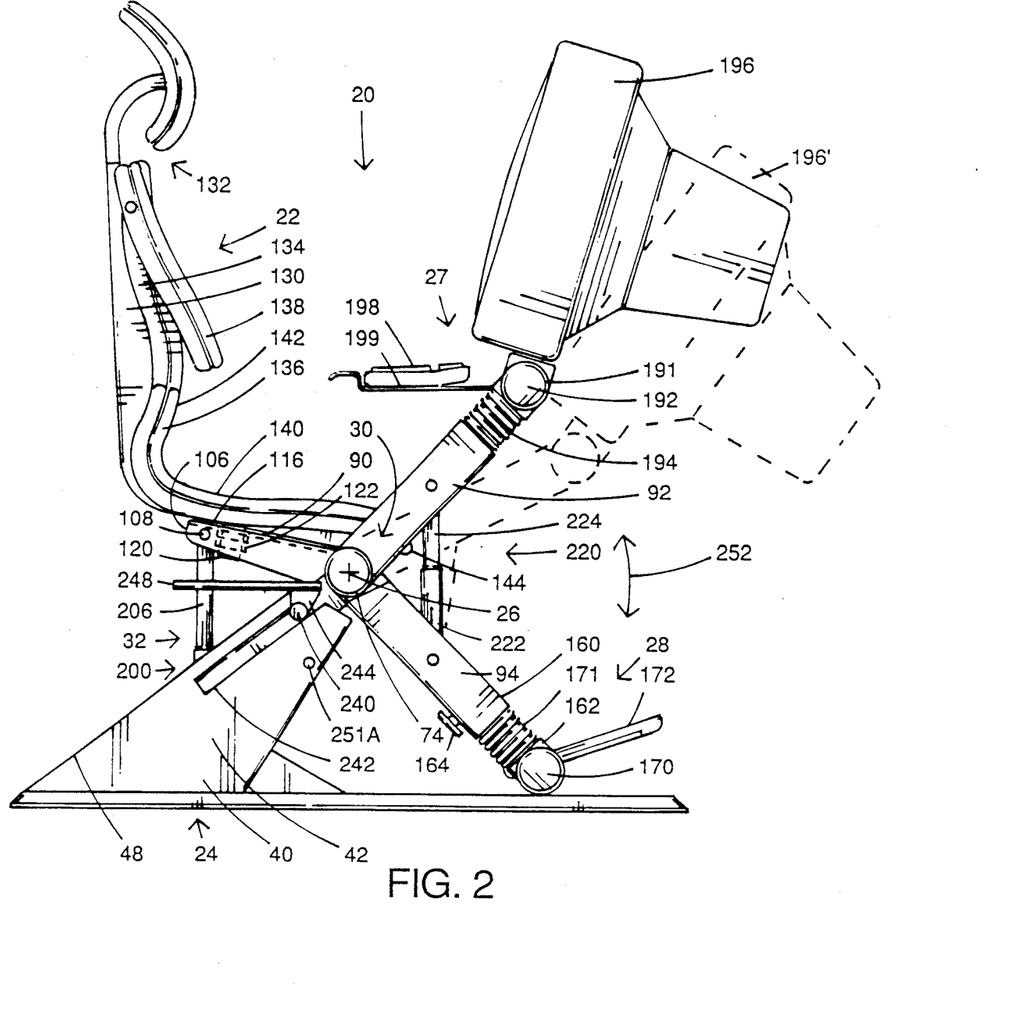
FIG. 2 is a side view of the work station system according to the embodiment of FIG. 1, but showing a seat in an erect position.
Figure 4:
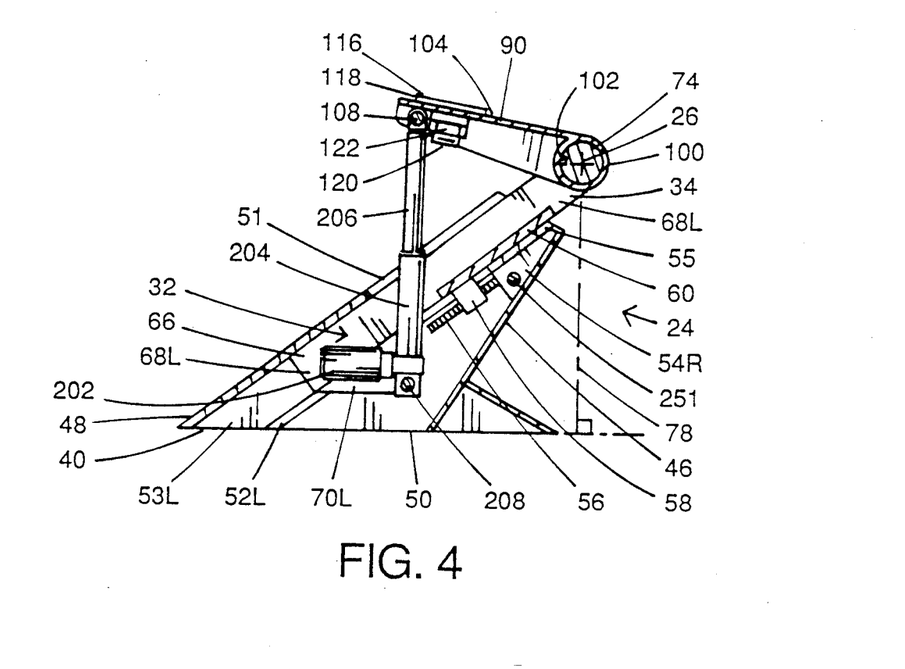
FIG. 4 is a sectional side view of a frame substructure of the work station system of FIG. 1 when the seat is in an erect and extended position.
Figure 6:
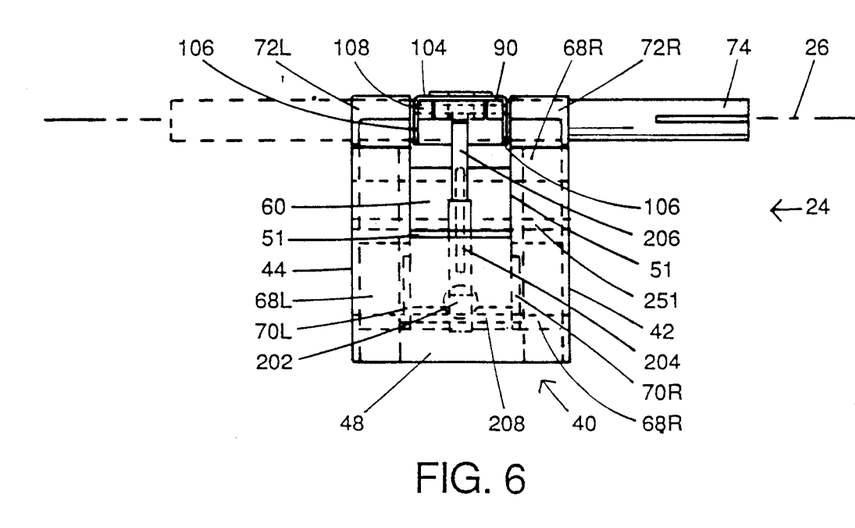
FIG. 6 is rear view of a frame substructure of the work station system of FIG. 1.

The frame substructure 24 comprises a frame housing 40 which includes a planar right sidewall 42; a planar left sidewall 44; a planar frontwall 46; and, a planar rearwall 48. As shown in FIGS. 1 and 2, for example, right sidewall 42 and left sidewall 44 are trapezoidal in shape. Due to the trapezoidal shapes of the sidewalls 42 and 44, the frontwall 46 and the rearwall 48 lie in planes which are angularly inclined with respect to the floor or base 50 upon Which the frame housing 40 rests. As shown in FIGS. 4 and 6, for example, the rearwall 48 has a rectangularly shaped aperture 51 formed therein.

Figure 5:
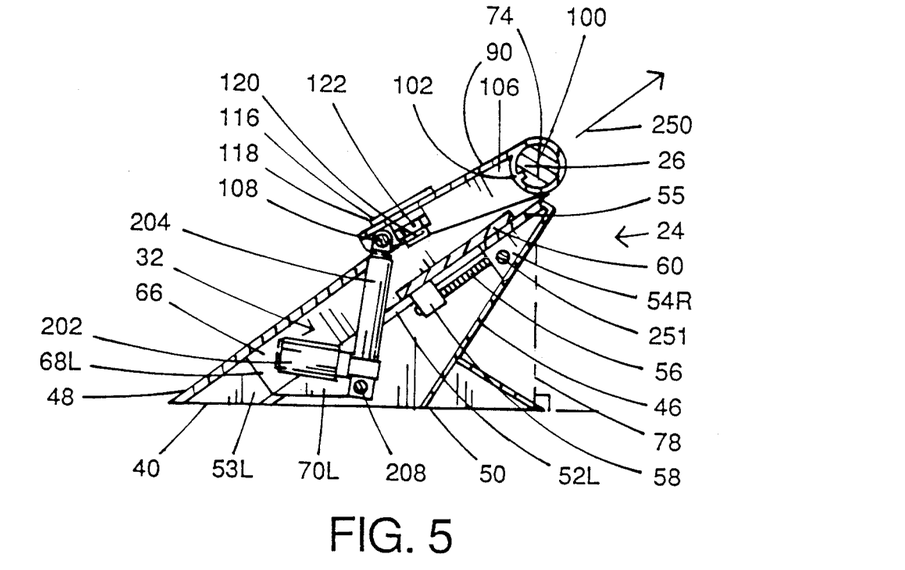
FIG. 5 is a sectional side view of a frame substructure of the work station system of FIG. 1 when the seat is in a reclined and retracted position.

The right sidewall 42 and the left sidewall 44 are provided with guide plates 52R and 52L, respectively. Guide plate 52L is shown in FIGS. 4 and 5. The guide plates 52 lie in planes substantially parallel to the rearwall 48 and extend interiorly from their respective sidewalls. The guide plates 52 extend from their respective sidewalls into the interior of the frame housing 40 to a point which is proximate the aperture 51 in the rearwall 48. That is, the guide plates 52 extend from their respective sidewalls approximately one-quarter of the width of the frame housing 40. At their frontwardmost extent, the guide plates 52 connect to the top of the frontwall 46.

Thus, the guide plates 52, the sidewalls 42 and 44 from which the guide plates 52 extend, and the rearwall 48, cooperate to provide opposed parallel rectilinear channels 53R and 53L which serve as guide means for the axis elevating means 34. In a manner to be described in more detail below, the channels 53 serve to define a continuous linear course of travel for the axis elevating means 34.

The frontwall 46 of frame housing 40 has a pair of spaced apart brackets 54R and 54L provided on the interior surface thereof. The brackets 54 support a crossbrace 55. An unillustrated block is welded beneath the crossbrace 55 intermediate the brackets 54. The unillustrated block has a counterthreaded bore therein sized to receive a forward end of threaded shaft 56. A rearward end of the threaded shaft 56 is received in a counterthreaded bore provided in block 58. Block 58 is welded to the underside of frame carriage crossbrace member 60, the function of which is described hereinafter. The mounting of the unillustrated block beneath crossbrace 55 is understood from the illustrated mounting of block 58 beneath frame carriage crossbrace member 60.

The axis elevating means 34 comprises a frame carriage 66. The frame carriage 66 comprises two parallel, essentially rectangular carriage bars 68R and 68L. The two carriage bars 68R and 68L are sized to slidably fit into respective guide channels 53R and 53L. The two carriage bars 68R and 68L are connected by the aforedescribed frame carriage crossbrace member 60. With the bars 68 and crossbrace member 60 thus connected, from above the frame carriage 60 has a quasi "H"-shaped appearance. At their rearmost and interiormost extent, the bars 68 each have a depending triangularly shaped bracket 70 formed on the underside thereof.

At their frontmost extent (i.e., the rightmost position as shown in FIGS. 1, 2, 4 and 5), the bars 68 each have a hollow cylindrical sleeve 72 formed therein for rotatably accommodating a rotatable shaft 74 which is colinear with the horizontal axis 26. The sleeves 72R and 72L are thus aligned along axis 26 to receive the shaft 74.

FIGS. 1, 4, and 5 show a perpendicular bisector 78 dropped from the horizontal axis 26 to the horizontal floor 50. FIGS. 1, 4, and 5 show that the frame substructure 24 is thus substantially entirely on one side of the perpendicular bisector 78. That is, in FIGS. 1, 4, and 5 the frame substructure 24 is on the left of the bisector 78. As shown in FIG. 1, the footrest assembly 28 is substantially entirely on a second (right) side of the bisector 78.

The coupling means 30 couples the chair 22, the device carriage 27, and the footrest assembly 28 to the rotatable horizontal shaft 74. The coupling means 30 includes a first coupling member 90 for coupling the chair 22 to the shaft 74; a second coupling member 92 for coupling the device carriage 27 to the shaft 74; and, a third coupling member 94 for coupling the footrest assembly 28 to the shaft 74.

The first coupling member 90 couples the chair 22 to the shaft 74. The first coupling member 90 is a cantilevered bracket having a proximal end 100 semi-cylindrically curled around shaft 74. As shown in FIGS. 4 and 5, proximal end 100 of the first coupling member 90 is locked on shaft 74 by key 102. As shown in FIG. 6, the first coupling member has a substantially "U"-shaped cross section as seen from the rear. In this regard, the first coupling member 90 has a chair-supporting surface 104 and two downwardly turned flanges 106. The flanges 106 are perpendicular to the chair-supporting surface 104; are parallel to one another; and, are on opposite sides of the chair-supporting surface 104. Beneath the chair-supporting surface 104, and toward the distal end thereof, the two opposed flanges 106 rotatably accommodate respective ends of drive connector shaft 108.

Figure 7:
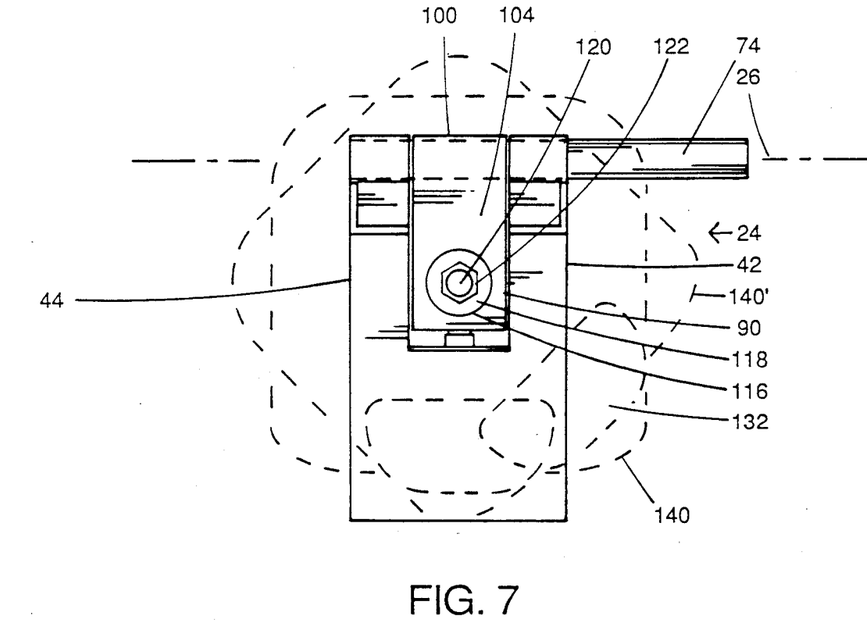
FIG. 7 is a top view of a frame substructure of the work station system of FIG. 1.

Toward its distal end, the chair-supporting surface 104 of the first coupling member 90 has an aperture formed therein to securely accommodate a chair mounting bushing 116 (see FIGS. 4, 5 and 7). The chair mounting bushing 116 has a top flange 118 which rests on top of the chair-supporting surface 104. A collar of the bushing 116 extends through the aperture formed in member 90. The bushing 116 has an inner diameter sized to accommodate a swivel pin 120 which depends from the underside of the chair 22 (see FIG. 1). The swivel pin 120 is threaded to receive lock nut 122 to retain the chair 22 on the chair coupling member 90. To facilitate the swivel action of the chair about a swivel axis which is colinear with the central axis of swivel pin 120, the bushing 116 is formed from a self-lubricating material such as nylon or brass.

The chair 22 has a rigid chair spine 130 which is surmounted by an extensible headrest 132. The chair spine 130 is covered with a layer of foam 134 and a cover layer of fabric 136. Pivotally connected to the chair 22 are arm support members 138. The manner and point of attachment of the arm support members 138 to the chair 22 is understood from U.S. Pat. Nos. 54,779,922 and 4,915,450, all of which are incorporated by reference herein in their entirety. As mentioned above, the chair 22 is provided with the swivel pin 120 which depends from the underside of the chair spine 130 for insertion into the bushing 116 carried on the chair coupling member 90.

As understood from U.S. Pat. Nos. 4,779,922 and 4,915,450, incorporated by reference herein, the chair 22 includes seat portion 140 for supporting the thigh portion of a human operator and a back portion 142 for contacting the back portion of a human operator. The seat portion 140 has a front edge 144 which is proximate the back of a seated human's knee. The front edge 144 of the chair 22, and hence the seated human's knee, is proximate the horizontal axis 26.

The footrest assembly 28 is connected to the shaft 74 by third coupling means 94. The third coupling means 94 is an elongated hollow leg member 160 having rectangular cross section. At its proximal end the leg member 160 has a cylindrical aperture for accommodating the shaft 74. The leg member 160 is securely locked onto an first end of the shaft 74 at one of a plurality of possible angular positions by a slot and key arrangement. The relationship of the leg member 160 and shaft 74, as well as the slot and key arrangement, are understood by reference to U.S. patent application Ser. No. 07/261,525, filed Oct. 24, 1988, and U.S. patent application Ser. No. 06/934,970, filed Nov. 25, 1986, now U.S. Pat. No. 4,779,922, and particularly with reference to the description in those applications of the connection of a carriage to a main pivot shaft.

The leg member 160 of the footrest assembly 28 has an ankle member 162 telescopically inserted into its distal end. Like the leg member 160, a first end of the ankle member 162 is a hollow, elongated member of rectangular cross section, with the outer cross sectional dimensions being sized for insertion and sliding movement within the inner cross sectional dimensions of the leg member 160. The first end of the ankle member 162 is locked into position within the leg member 160 by a locking screw 164 carried on the underside of the leg member 160.

A second end of the ankle member 162 is formed to accommodate a rotatable shaft 170. The second end of the ankle member 162 is connected to distal end of the leg member 160 by a collapsible bellows 171. The rotatable shaft 170 has keyed thereto a footrest platform 172. Thus, by loosening the locking screw 164, the ankle member 162 can be slid along the major axis of the leg member 160 so that the footrest platform 172 is at a desired distance from the shaft 74, and the screw 164 again tightened. Also, the footrest platform 172 can be pivoted to a desired orientation.

In view of the fact that the third coupling means 94 is attached to the first end of the shaft 74, a substantially unobstructed space is provided between the footrest platform 172 and the front edge 144 of the chair 22.

The device carriage 27 is coupled to the shaft 74 by the second coupling member 92. Like the footrest leg member 160, the second coupling member, or device carriage coupling member 92, is an elongated hollow member having rectangular cross section. A proximal end of the device carriage coupling member 92 forms a sleeve 180 Which rotatably accommodates shaft 74 therethrough.

By analogy to the footrest leg member 160 and the footrest ankle member 162, the device carriage coupling member 92 has a telescoping extension member 190. Telescoping extension member 190 has a first end Of reduced cross section Which is insertable into the distal end of the device carriage coupling member 92. A second end of the telescoping extension member 190 forms a sleeve 191 for accommodating a shaft 192. A flexible bellows 194 connects the telescoping extension member 190 to the second end of the device carriage coupling member 92.

Figure 3:
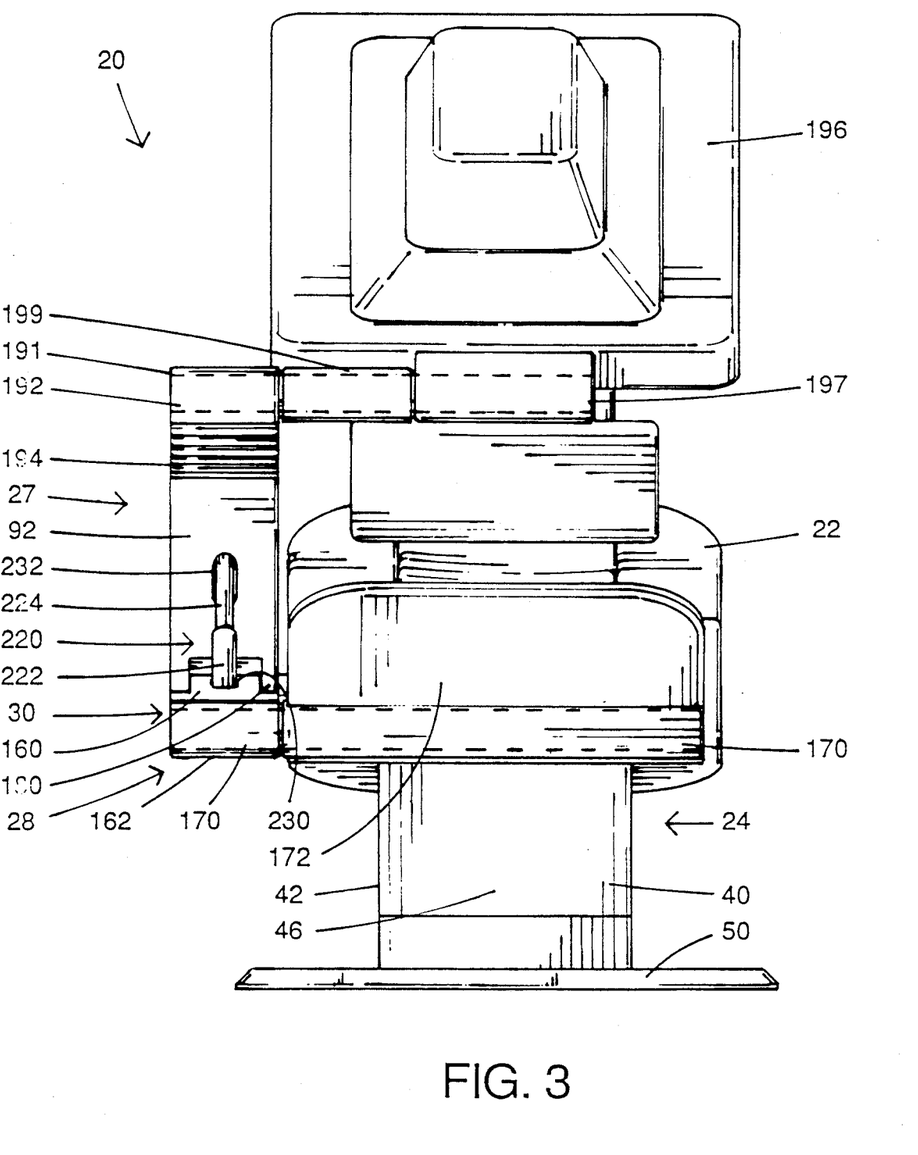
FIG. 3 is a view of the work station system according to the embodiment of FIG. 1.

The shaft 192 extends axially beyond the device carriage coupling member 92 into the plane of the paper in FIG. 1 (or rightwardly as shown in FIG. 3). The shaft 192 ultimately has two devices connected or mounted thereto. A first device, such as monitor display 196, is mounted on a sleeved bracket 197 which fits over the shaft 192. A second device, such as keyboard 198, depends from a sleeved bracket 199 which also fits over the shaft 192. FIG. 3 shows the neighboring relation of the brackets 197 and 199 across the width of the work station. The brackets 197 and 199 are axially retained on the shaft by well known means such as by a shaft cap or tightenable knobs.

Although a particular embodiment of the device carriage 27 is illustrated in FIGS. 1–2, it should be understood that other types of carriages, possibly carrying other types of devices, may be employed. For example, the carriages shown in U.S. patent application Ser. No. 07/261,525, filed Oct. 24, 1988, and U.S. patent application Ser. No. 06/934,970, filed Nov. 25, 1986, now U.S. Pat. No. 4,779,922, may be utilized. Moreover, the man skilled in the art will realize that additional device supports can be attached or appended to the device carriage.

The pivoting drive means 32 serves to selectively pivot the chair 22, the device carriage 27, and the footrest assembly 28 in unison about the rotational axis 26 (i.e., about shaft 74). The pivoting drive means 32 includes a conventional electric worm gear drive 200. As shown in FIGS. 4–6, the worm gear drive 200 includes an electric drive motor 202 and telescoping drive cylinders, in particular lower cylinder 204 and upper cylinder 206. In one embodiment the worm gear drive 200 is manufactured by Duff-Norton as model number SPA-6405.

At its lower end the lower cylinder 204 is pivotally connected to a shaft 208 that is carried between the two triangularly-shaped carriage bar brackets 70R and 70L. At its upper end, the upper cylinder 206 is similarly pivotally connected to the drive connector shaft 108 that is carried between the depending flanges 106 provided on the chair coupling member 90. As shown in FIGS. 4 and 5, the cylinders 204 and 206 of the worm gear drive 200 extend through the aperture 51 provided in the rearwall 48 of the frame housing 40.

The angular orientation of the device carriage 27 about the shaft 74 may be adjusted relative to the position of the footrest assembly 28 using carriage inclination adjustment means 220. As shown in FIGS. 1-3, the carriage inclination adjustment means 220 comprises a worm gear drive similar to the afore-described worm gear drive 200. The worm gear drive of the carriage inclination adjustment means 220 includes an unillustrated drive motor; lower cylinder 222; and, upper cylinder 224. A lower end of the lower cylinder 222 is pivotally attached to a pin 226 carried in the interior of the footrest leg member 160. An upper end of the upper cylinder 224 is pivotally attached to a pin 228 carried in the interior of the carriage coupling member 92. As shown in FIG. 3, the upper surface of the footrest leg member 160 has an aperture 230 therein through which the lower cylinder 222 extends; the underside surface of the carriage coupling member 92 has an aperture 232 therein through which the upper cylinder 224 extends.

The worm gear drives described herein are electrically operated and have electrical switches placed in proximity to the seated human operator for controlling the actuation of the worm gear drives.

The right frame carriage bar 68R has a bar extension 240 provided thereon which extends out of the plane of the paper in FIG. 1 and through a slot 242 provided in the rightside wall 42 of the frame housing 40. The bar extension 240 is a straight shaft having a first end connected to the frame carriage bar 68R. A second end of the bar extension 240 has a vertical bracket 244 provided thereon. A planar support surface 248 is mounted on the upper end of the vertical bracket 244. The support surface 248 extends from the region of the shaft 74 rearwardly toward the seated operator and is accessible by the operator.

The work station system according to the invention accommodates human operators of different sizes, and permits a seated operator to assume changeable orientations without changing the spatial relationship between the seated operator and user interactive devices mounted or carried on the device carriage 27. The operator is granted graceful ingress and egress from the work station, and has convenient access to multiple device and work support surfaces.

For ingress into the work station system, the pivoting drive means 32 is preferably set so that the chair 22, the device carriage 27, and the footrest assembly 28 are oriented in the manner shown in FIG. 2. For ingress, the operator may swivel the chair 22 about the axis of swivel pin 120 so that the seat portion of the chair 22 acquires the orientation shown by broken lines 140' in FIG. 7. Once seated, the operator can swivel the chair 22 back so that the seat portion acquires the orientation shown by broken lines 140 in FIG. 7.

It should be noted that both the chair 22 and the footrest assembly 28 are rigidly connected to the shaft 74. That is, although the shaft 74 with the chair 22 and footrest assembly 28 rigidly secured thereto may rotate about axis 26 under the control of the pivoting drive means 32, neither the chair 22 nor the footrest assembly 28 can rotate relative to the shaft 74. Moreover, when the pivoting drive means 32 is in a set position, such as the position shown in FIG. 2, the shaft 74, the Chair 22, and the footrest assembly 28 are angularly stationary with respect to the horizontal axis 26. In this regard, the worm gear drive 200 of the pivoting drive means 32 serves to lock the chair 22 and the footrest assembly 28 into position, since the worm gear drive 200 is inherently a self locking drive. That is, the load on the worm gear output shaft cannot feed back through the worm gear and cause the drive motor input shaft to turn.

If an operator determines that the current setting of the footrest assembly 28 does not comfortably accommodate the operator's legs, the operator can easily adapt the footrest assembly 28. For example, if the operator requires more leg room, the operator can raise the horizontal axis 26 and lengthen the extent of the footrest assembly 28. In this respect, if it is assumed that upon the operator's initial seating the frame carriage 66 is in the retracted position shown in FIG. 5, the operator can access the threaded shaft 56 using a hand crank to rotate the shaft 56 so that the frame carriage 66 travels angularly upwardly along the guide channels 53 in the direction of arrow 250 shown in FIG. 5 to achieve a desired elevation such as that shown in FIG. 4. In this regard a second threaded shaft 251 is connected to shaft 56 in perpendicular fashion and is carried by brackets 54R and 54L. The second threaded shaft 251 is accessible through an aperture 251A provided on the right sidewall 42 (see FIG. 1). Shaft 251 meshes with shaft 56 so that rotation of shaft 251 via the unillustrated hand crank causes rotation of shaft 56, and hense translation of the frame carriage 66.

Once the elevation of the horizontal axis 26 has been adjusting in the manner just described, the operator can lengthen the extent of the footrest assembly 28 by loosening the locking screw 164 provided on the footrest leg 160 and sliding the footrest ankle 162 to the desired extent, as described hereinbefore. The operator then tightens the locking screw 164.

When seated in the chair 22, the operator can adjust the spatial distance between himself and the device carriage 27. This adjustment is accomplished using the carriage inclination adjustment means 220. The operator actuates the drive motor for the worm gear drive included in the adjustment means 220 so that device carriage 27 and the footrest assembly 28 are at a desired angle 252 with respect to one another about the horizontal axis 26. When the adjustment means 220 is set at the desired angle, that angle is maintained by virtue of the already-explained self locking features of the worm gear drive. In this respect, the broken lines 196' (FIG. 2) shows another and smaller angle 252 between the device carriage 27 and the footrest assembly 28.

With the chair 22 and the footrest assembly 28 rigidly connected to the shaft 74, and with the device carriage 27 in fixed angular relation to the footrest assembly 28 in the manner just described, it is understood that a constant spatial relationship is maintained between the chair 22 and the device carriage 27, and hence between an operator seated in the chair 22 and devices carried on the device carriage 27.

The constant spatial relationship between the chair 22 and the device carriage 27 is maintained even as the chair 22, the device carriage 27, and the footrest assembly 28 are pivoted in unison about the horizontal axis 26. In this regard, the work station system can be pivoted to the reclined orientation shown in FIG. 1, or to the erect orientation shown in FIG. 2, without changing this spatial relationship.

The operator can pivot the work station system 20, such as to the reclined orientation of FIG. 1 or to the erect orientation shown in FIG. 2, by actuating the worm gear drive 200 of the pivoting drive means 32. As mentioned above, as the upper cylinder 206 of the drive 200 extends, the chair 22, the device carriage 27, and the footrest assembly 28 move together in unison while maintaining the fixed spatial relationship between these elements.

While the invention has been particularly shown and described with reference to the preferred embodiments thereof, it will be understood by those skilled in the art that various alterations in form and detail may be made therein without departing from the spirit and scope of the invention. For example, although the drawings illustrate a work station system wherein ingress and egress occur at a left side, it should be understood that in other embodiments a right entry and exit is provided.

The embodiments of the invention in which an exclusive property or privilege is claimed are defined as follows:

1. A work station comprising:
   frame means for holding aloft an horizontal axial member;
   a chair for supporting a human operator;
   a device carriage for supporting an operator-interactive device;

footrest means;

first coupling means upon which said chair is mounted, said first coupling means comprising a bracket having a proximal end attached to said axial member;

second coupling means for coupling said device carriage to said axial member, said second coupling means comprising an elongated member having a proximal end attached to said axial member;

third coupling means for coupling said footrest means to said axial member, said second coupling means comprising an elongated member having a proximal end attached to said axial member;

pivoting means for selectively pivoting in unison said chair, said device carriage, and said footrest means about a horizontal axis of said horizontal axial member; and, elevating means included in said frame means for selectively elevating said horizontal axial member.

2. The apparatus of claim 1, wherein said horizontal axial member is a horizontal shaft held aloft by said frame means, and wherein said coupling means comprises:

a first coupling member for coupling said chair to said shaft;

a second coupling member for coupling said device carriage to said shaft; and, a third coupling member for coupling said footrest means to said shaft.

3. The apparatus of claim 1, wherein said chair is swivelly connected to said first coupling member about a swivel axis to facilitate ingress and egress from said chair.

4. The apparatus of claim 1, wherein said footrest means is adjustably extendable from said horizontal axial member.

5. The apparatus of claim 1, wherein said device carriage is adjustably extendable from said horizontal axial member.

6. The apparatus of claim 1, wherein the angular distance about said horizontal axial member between said footrest means and said device carriage is adjustable.

7. The apparatus of claim 1, wherein said elevating means included in said frame means comprises frame carriage means; and wherein said frame means comprises guide means for defining a course of travel for said frame carriage means.

8. The apparatus of claim 7, wherein said guide means defines a linear course of travel for said frame carriage means, said linear course of travel having a major axis inclined at an angle with respect to the horizontal.

9. The apparatus of claim 8, wherein said angle is on the order of about 45 degrees with respect to the horizontal.

10. The apparatus of claim 7, further comprising frame carriage drive means for moving said frame carriage along said course of travel.

11. The apparatus of claim 7, wherein said frame carriage has attached thereto said pivoting means for selectively pivoting said chair about said horizontal axial member.

12. The apparatus of claim 11, wherein said first coupling member has said pivoting means connected thereto.

13. The apparatus of claim 7, wherein said frame carriage means carries a support surface accessible by said operator.

14. The apparatus of claim 13, wherein said frame means has a housing, said housing being provided with a slot which is essentially parallel to said course of travel, and wherein said frame carriage means has an extension member thereon which extends through said slot in said housing for carrying said support surface accessible by said operator.

15. The apparatus of claim 1, wherein if a perpendicular bisector were dropped to the ground from said horizontal axial member, said frame means is positioned substantially entirely to one side of said perpendicular bisector.

16. The apparatus of claim 1, wherein said frame means has a front wall which is angularly inclined with respect to the horizontal and which extends towards said horizontal axial member.

17. A work station comprising:

frame means for holding aloft a horizontal axial member;

a chair for supporting a human operator;

a device carriage for supporting an operator-interactive device;

footrest means;

first coupling means upon which said chair is mounted, said first coupling means comprising a bracket having a proximal end attached to said axial member;

locking means on said first coupling means for selectively locking said first coupling means onto said axial member;

second coupling means for coupling said device carriage to said axial member, said second coupling means comprising an elongated member having a proximal end attached to said axial member;

third coupling means for coupling said footrest means to said axial member, said third coupling means comprising an elongated member having a proximal end attached to said axial member;

locking means on said third coupling means for selectively locking said third coupling means onto said axial member;

device carriage inclination adjustment means connected to said device carriage for adjusting the angular orientation of the device carriage about the horizontal axial member relative to the footrest means; and, pivoting means attached to said frame means for selectively pivoting in unison said chair, said device carriage, and said footrest means about a horizontal axis of said horizontal axial member after the locking of both of said locking means.

18. The apparatus of claim 17, wherein said chair is swivelly attached to first coupling means about a swivel axis carried by said first coupling means.

19. A work station comprising:

frame including a frame housing;

a chair for supporting a human operator, said chair being held aloft by said frame means;

elevating means included in said frame means beneath said chair for selectively elevating said chair, said elevating means further comprising:

frame carriage means which is at least partially translatably housed in said frame housing and which holds aloft said chair;

a horizontal support surface accessible by said operator, said horizontal support surface being attached to said elevating means beneath said chair.

20. The apparatus of claim 19, further comprising guide means provided in said frame housing for defining a course of travel for said frame carriage means; wherein said frame housing is provided with a slot which is essentially parallel to said course of travel; and wherein said frame carriage means has an extension member thereon which extends through said slot in said housing for carrying said support surface accessible by said operator.

21. A work station comprising:
frame means for holding aloft a horizontal axial member;
a chair for supporting a human operator;
a device carriage for supporting an operator-interactive device;
first coupling means upon which said chair is mounted, said first coupling means comprising a bracket having a proximal end attached to said axial member;
second coupling means for coupling said device carriage to said axial member, said second coupling means comprising an elongated member having a proximal end attached to said axial member;
means for swivelly connecting said chair about a swivel axis to said first coupling member, said swivel connecting means facilitate ingress and egress from said chair; and,
pivoting means attached to said frame means for selectively pivoting said chair and said device carriage about a horizontal axis of said horizontal axial member.

22. A work station comprising:
frame means for holding aloft a horizontal axial member;
a chair for supporting a human operator, said chair including a chair front edge which is proximate the back of a seated operator's knee;
a device carriage attached to said frame means for supporting an operator-interactive device;
footrest means;
chair coupling means upon which said chair is mounted, said chair coupling means comprising a bracket having a proximal end attached to said axial member;
footrest coupling means for coupling said footrest means to said axial member, said footrest coupling means comprising an elongated cantilevered member having a proximal end attached to a first end of said axial member and a distal end having said footrest means coupled thereto, whereby said footrest means is suspended from said first end of said axial member for permitting ingress and egress to said work stations at an opposite end of said axial member, and whereby an unobstructed space is provided between said footrest means and chair front edge; and,
pivoting means attached to said frame means for selectively pivoting in unison said chair and said footrest means about said a horizontal axis of horizontal axial member.

23. The apparatus of claim 22, further comprising elevating means included in said frame means for selectively elevating said horizontal axial member.

* * * * *